US011561654B2

(12) United States Patent
Mandziy et al.

(10) Patent No.: US 11,561,654 B2
(45) Date of Patent: Jan. 24, 2023

(54) MACHINE LEARNING-BASED POSITION DETERMINATION

(71) Applicant: Cypress Semiconductor Corporation, San Jose, CA (US)

(72) Inventors: Vasyl Mandziy, Lviv (UA); Oleksandr Karpin, Lviv (UA); Igor Kolych, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/313,178

(22) Filed: May 6, 2021

(65) Prior Publication Data

US 2022/0365616 A1 Nov. 17, 2022

(51) Int. Cl.
*G06F 3/044* (2006.01)
*G06N 3/04* (2006.01)

(52) U.S. Cl.
CPC .............. *G06F 3/044* (2013.01); *G06N 3/04* (2013.01)

(58) Field of Classification Search
None
See application file for complete search history.

(56) References Cited

U.S. PATENT DOCUMENTS

2018/0074637 A1* 3/2018 Rosenberg .......... G06F 3/04186
2018/0181245 A1* 6/2018 Beck .................. G06F 3/04883
2019/0242689 A1* 8/2019 Elhajj ..................... G01B 7/08

* cited by examiner

*Primary Examiner* — Stephen T. Reed

(57) ABSTRACT

An example method of determining the position value reflecting an action applied to the capacitive sensor device comprises: receive a set of capacitance values of a plurality of capacitive cells of a capacitive sensor device; determining a local maximum of the set of capacitance values; identifying a set of neural network parameters corresponding to the local maximum of the set of capacitance values; and processing the set of capacitance values by a neural network using the identified set of neural network parameters to determine a position value reflecting an action applied to the capacitive sensor device.

20 Claims, 8 Drawing Sheets

MACHINE LEARNING-BASED POSITION DETERMINATION

BACKGROUND

Various input devices, such as touchscreens, trackpads, sliders, etc., may employ capacitive cell structures. Bringing a finger or a conductive stylus to the surface of a capacitive cell would change its capacitance, which may be measured and then utilized for touch position determination.

BRIEF DESCRIPTION OF THE DRAWINGS

The present disclosure is illustrated by way of example, and not of limitation, in the figures of the accompanying drawings in which.

DETAILED DESCRIPTION

Figure 1:
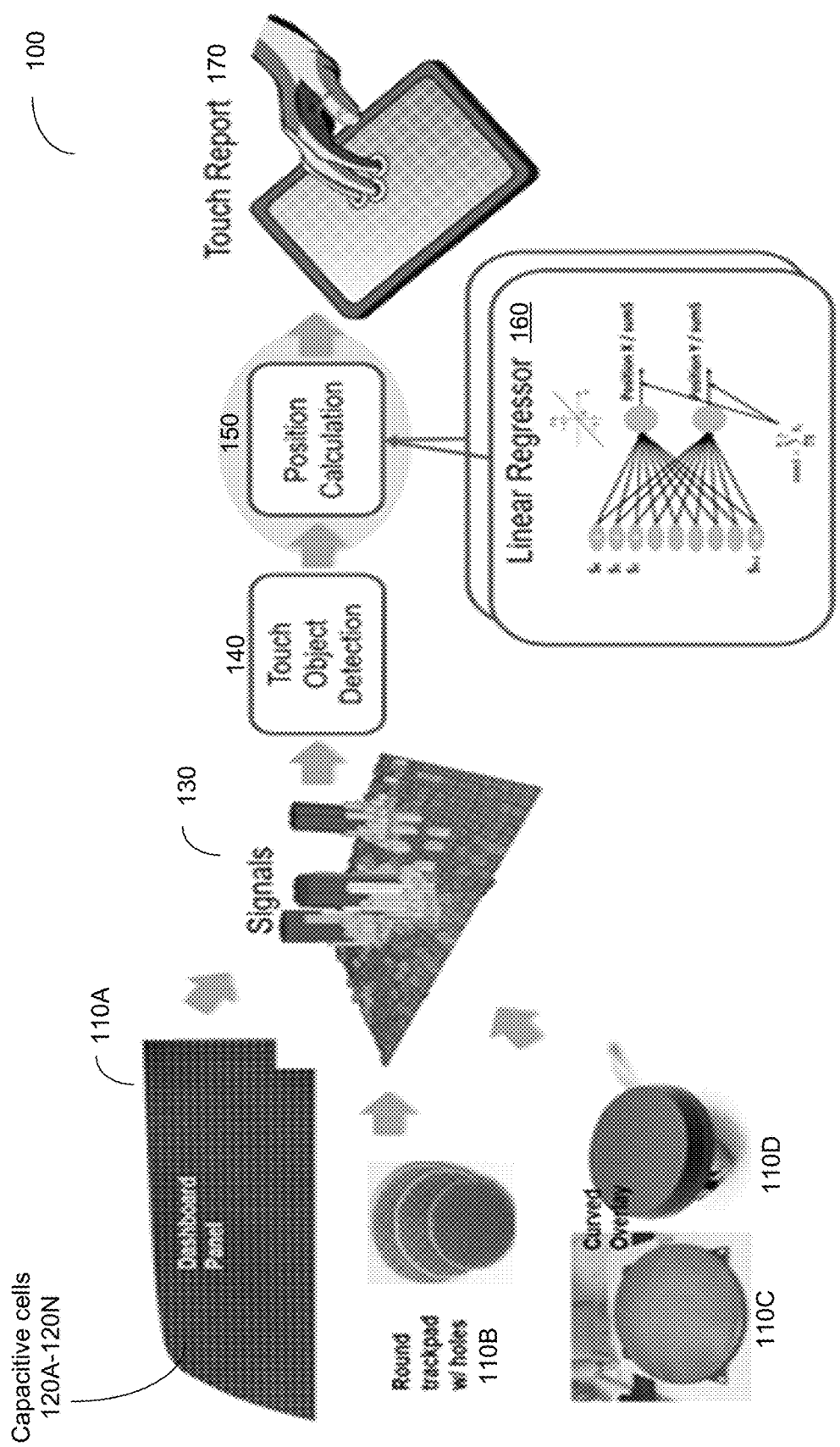
FIG. 1 schematically illustrates an example process of touch position detection, implemented in accordance with aspects of the present disclosure.

The embodiments described herein are directed to systems and methods for machine learning-based methods of position determination. In various illustrative examples, the methods and systems of the present disclosure may be used, for example, for determining the touch position on a touch screen, for determining the liquid level, and/or for similar positioning tasks.

Conventional position determination methods often assume a planar rectangular shape of the input device (e.g., a touch screen). Accordingly, attempts to apply such methods to input devices having non-planar, curve-shaped, irregularly shaped, or non-compact surfaces would require significant adaptation efforts and might still produce unreliable results and/or fail to meet various performance requirements (such as accuracy, latency, and/or memory footprint).

The systems and methods implemented in accordance with the present disclosure address the above-noted and various other deficiencies of conventional systems and methods by employing trainable models (also known as machine learning-based models) for determining touch positions in capacitive cell structures such as touchscreens, trackpads, sliders, liquid level gauges, etc. In some implementations, the methods and systems described herein may employ a trainable regression model for a subset of capacitive cells comprising one or more capacitive cells of the sensor device, thus effectively adapting the structure and parameters of the computational module to the sensor geometry.

In some implementations, the trainable models employed for position determination may be implemented by neural networks. A neural network is a computational model that includes multiple inter-connected nodes called "artificial neurons," which loosely simulate the neurons of a living brain. An artificial neuron processes a signal received from another artificial neuron and transmit the transformed signal to other artificial neurons. The output of each artificial neuron may be represented by a combination of one or more linear and/or non-linear operations performed on its inputs.

Edge weights, which increase or attenuate the signals being transmitted through respective edges connecting the neurons, as well as other network parameters, may be determined at the network training stage, by employing supervised and/or unsupervised training methods. In an illustrative example, all the edge weights may be initialized to random values. For every input in the training dataset, the neural network is activated. The observed output of the neural network is compared with the desired output specified by the training data set, and the error is propagated back to the previous layers of the neural network, in which the weights are adjusted accordingly. This process may be repeated until the observed error would fall below a predetermined error threshold.

Thus, the systems and methods described herein produce reliable positioning results with little or no dependence on the form factor of the sensor, exhibit better performance (in terms of accuracy, latency, and/or memory footprint), and reduce the development time and effort as compared to various conventional positioning methods.

Furthermore, employing neural network-based models allows using various neural network-specific efficiency improvement techniques, such as pruning (modifying a neural network structure by permanently dropping some artificial neuron connections from the network, and thus reducing the overall computational complexity of implementing the neural network), quantization (replacing floating point values with integer values in order to improve the computational efficiency of the processor and decrease the memory footprint), and/or various other techniques.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof. The methods and systems of the present disclosure may be implemented by various hardware platforms, including computing devices having limited computational capacity and/or available memory (such as portable communication devices, embedded devices, Internet of Things (IoT) devices, etc.).

FIG. 1 schematically illustrates an example process of touch position detection, implemented in accordance with aspects of the present disclosure. As schematically illustrated by FIG. 1, the example process 100 may be applied to a variety of touch input devices 110A-110D, which may have different form factors. In particular, the touch input devices 110A-110D may have non-planar, curve-shaped, irregularly shaped, or non-compact (i.e. containing holes) surfaces. In addition to the example input devices illustrated by FIG. 1, the methods of the present disclosure may be applied to input devices having various other non-planar, curve-shaped, irregularly shaped, or non-compact surfaces.

The touch surface of each touch input device 110A-110D is provided by a capacitive sensor that includes multiple capacitive cells 120A-120N arranged into a two-dimensional grid. Bringing a finger or a conductive stylus to the surface of a capacitive cell would affect its capacitance, which may be measured (e.g., by measuring the charge, current, or voltage on a conductive line electrically coupled to the capacitive cell). The measurement results may be stored, e.g., in a rectangular matrix, and may be visualized by a heatmap 130, in which each capacitive cell is represented by a column, and the magnitude and/or color reflects the measured capacitance of the respective capacitive cell.

The measured capacitance values represented by the heatmap 130 may be utilized for performing the touch object detection operation 140, which may involve identifying one or more local maxima of the measured capacitance values represented by the heatmap 130. In some implementations, the identified local maxima may be filtered, e.g., by discarding the local maxima having the capacitance values below a predefined threshold.

The position calculation operation 150 may involve processing the measured capacitance values in the vicinity of the identified local maxima in order to determine one or more touch positions. The position calculation operation 150 may be implemented by a firmware module executable by a microprocessor, by a software module executable by a general purpose processor, by one or more field programmable gate array (FPGA) modules, and/or by any other suitable software and circuitry. In some implementations, the position calculation operation 150 may employ, for each subset of capacitive cells comprising one or more capacitive cells 120, its regression models 160 implemented in accordance with aspects of the present disclosure, as described in more detail herein below.

The screen coordinates of the detected touch positions may be represented by the touch report 170, which may be represented by a message specifying the touch position (e.g., the X and Y screen coordinates) and various optional parameters of the detected touch event. The touch report may be sent, e.g., to the processing thread that implements the graphical user interface (GUI) servicing one or more applications.

Figure 2:
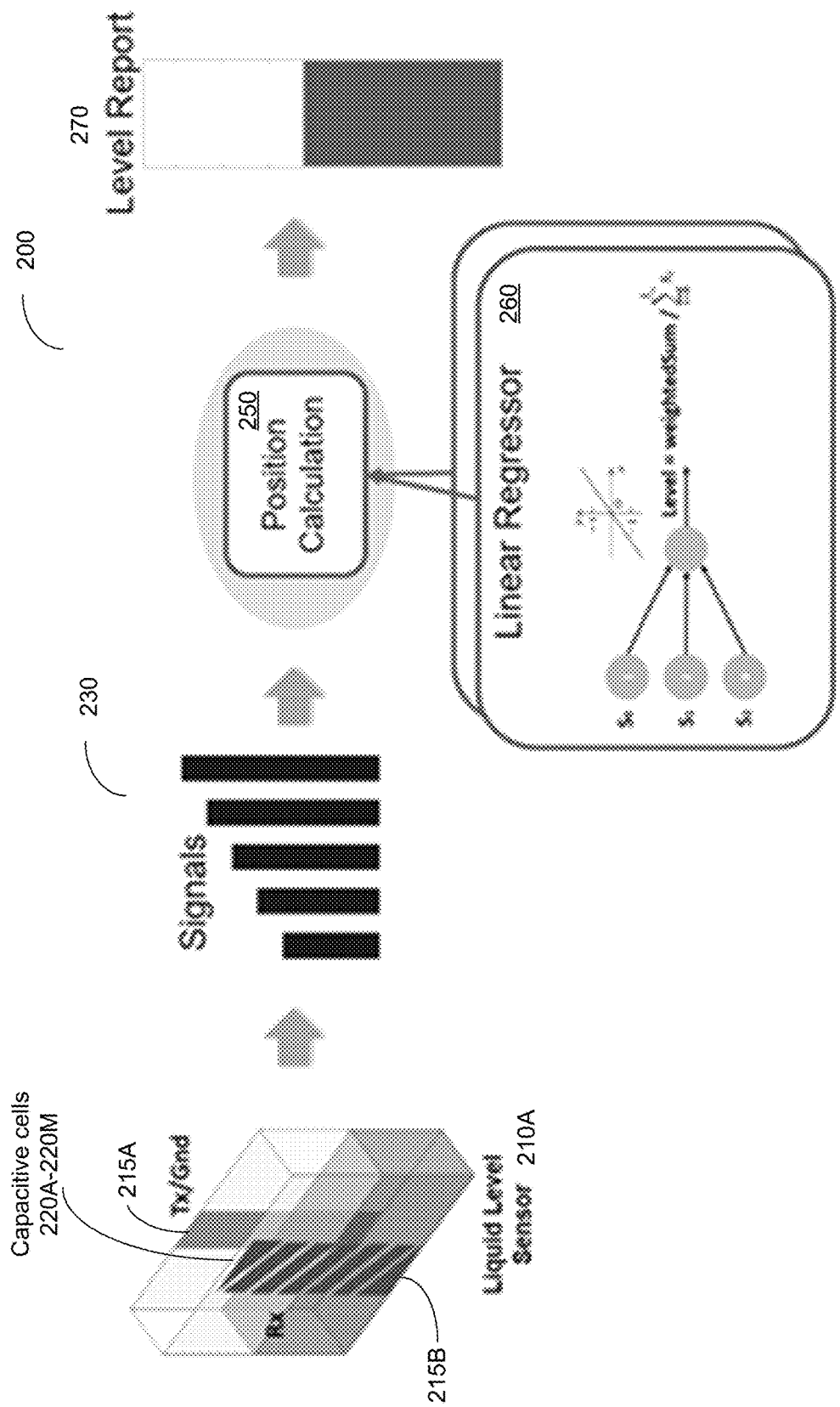
FIG. 2 schematically illustrates an example process of liquid level detection, implemented in accordance with aspects of the present disclosure.

As noted herein above, the systems and methods of the present disclosure may similarly be applied to determining liquid levels measured by liquid level gauges. Accordingly, FIG. 2 schematically illustrates an example process of liquid level detection, implemented in accordance with aspects of the present disclosure. The example process 200 may be applied to a variety of liquid level gauges 210, which may have different form factors, including various irregular shapes.

In the illustrative example of FIG. 2, the liquid level gauge 210 is provided by a container, which can have the shape of a convex polyhedron (e.g., a cuboid). Two opposite surfaces of the liquid level gauge 210 have conductive layers attached to their respective external sides, such that one of the pair of conductive layers (e.g., conductive layer 215A) is electrically coupled to the ground, while the other conductive layer (e.g., conductive layer 215B) is represented by a set of parallel conductive stripes 220A-220M, which are disposed at an acute angle to the horizon (and to the liquid-air boundary).

Thus, the conductive layers 215A-215B attached to the surfaces of the liquid level gauge 210 effectively form a capacitive sensor that includes multiple capacitive cells 220A-220M. The liquid filling the container would affect the capacitance of the capacitive cells which are at least partly disposed below the liquid-air boundary. The measurement results may be stored, e.g., in a vector, and may be visualized by a histogram 230, in which each capacitive cell is represented by a column, the magnitude of which reflects the measured capacitance of the respective capacitive cell.

The measured capacitance values represented by the histogram 230 may be utilized for performing the liquid level calculation operation 250, which may be implemented by a firmware module executable by a microprocessor, by a software module executable by a general purpose processor, by one or more field programmable gate array (FPGA) modules, and/or by any other suitable software and circuitry. The liquid level calculation operation 250 may involve identifying one or more capacitive cells 220 that are located in the vicinity of the air-liquid boundary. In some implementations, the liquid level calculation operation 250 may employ, for each subset of capacitive cells comprising one or more capacitive cells 220, its regression models 260 implemented in accordance with aspects of the present disclosure, as described in more detail herein below. The measured liquid level may be represented by the level report 270, which may be represented by a message specifying the liquid level (e.g., the X coordinate) and various optional parameters of the detected touch event. The level report may be sent, e.g., to one or more applications.

Figure 3:
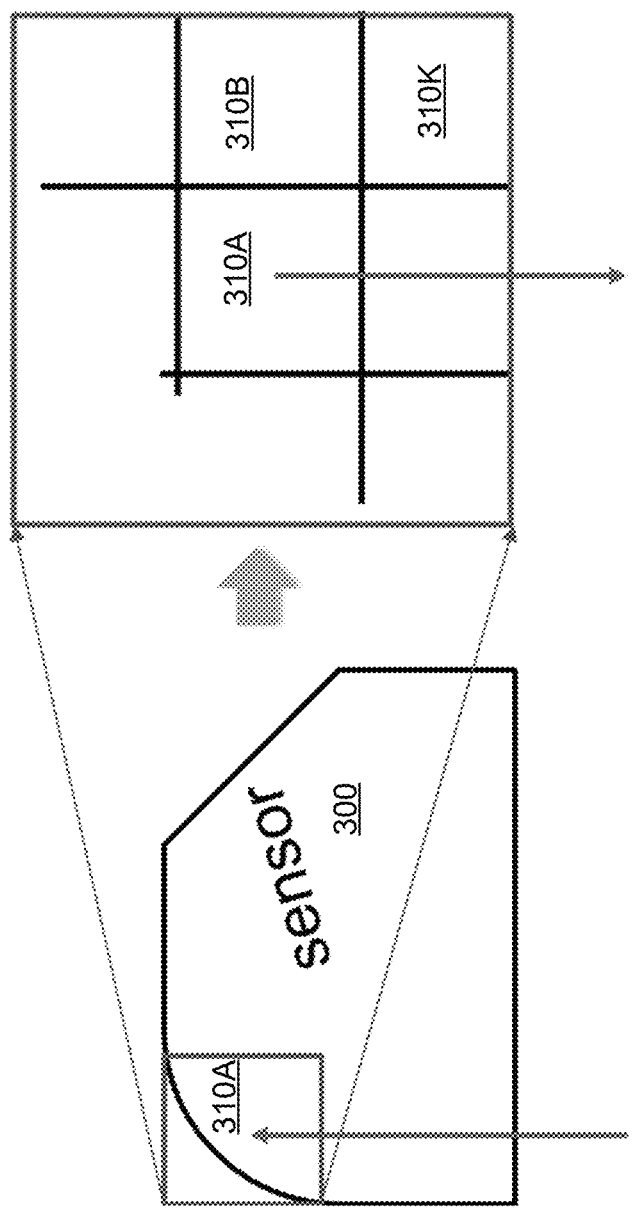
FIG. 3 schematically illustrates an example grid of capacitive cells forming a surface of a touch sensor, in accordance with aspects of the present disclosure.

As noted herein above, the measured capacitance values of capacitive cells forming the capacitive sensor (such as the touch input device 110 or the liquid level gauge 210) may be stored in a suitable data structure (e.g., a vector or a rectangular matrix). One or more local maxima of the measured capacitance values may be identified (e.g., by the exhaustive analysis of the stored capacitance values). In the illustrative example of FIG. 3, which schematically illustrates an example grid of capacitive cells forming a surface of a touch sensor, the touch input device 300 may include multiple capacitive cells 310A-310K arranged into a two-dimensional grid, and the local maximum of the measured capacitance is reached in the capacitive cell 310 of the sensor 300. The identified local maxima values and coordinates of their respective capacitive cells may then be utilized for determining the touch position or the liquid level.

Despite the likely nonlinear nature of the underlying physical processes, the dependence of the touch position on the measured capacitance values can, at least in the vicinity of the local maximum of the measured capacitance, be approximated with the desired accuracy by the equations defining the centroid of the weighted capacitance values:

$$\begin{cases} xPos = ResolutionX \cdot \dfrac{\sum_{i=0}^{N-1} W_{i,0} \cdot S_i}{\sum_{i=0}^{N-1} S_i} \\ yPos = ResolutionY \cdot \dfrac{\sum_{i=0}^{N-1} W_{i,1} \cdot S_i}{\sum_{i=0}^{N-1} S_i} \end{cases} \quad (1)$$

where xPos and yPos are coordinates of the touch position along the respective axes, ResolutionX and ResolutionY are scaling factors on the respective axes, $s_i$ are the measured capacitance values, $w_{i0}$ and $w_{i1}$ are weight coefficients to be applied to the measurements along the respective axes, and N is the number of capacitance measurements.

Accordingly, the touch position coordinates may be determined based on a set of capacitance measurements assuming that the set of weight coefficients is known.

For planar touch input devices, the weight coefficients may be assumed to have substantially similar values for capacitive cells located within a central area of the capacitive cell structure. However, capacitive cells located within peripheral areas of the capacitive cell structure may have substantially different weight coefficients, which may be explained by the differences in the surface curvature, different numbers of neighboring capacitive cells, and/or other factors affected by the shape of the capacitive cell structure and the location of a given capacitive cell within the structure.

Furthermore, even if a non-planar, curve-shaped, irregularly shaped, or non-compact surface may include one or more subsets of capacitive cells having substantially similar values of their respective weight coefficients, a priori identification of such subsets of cells may be impractical, and thus all capacitive cells arranged of such surfaces may be assume to have substantially different weight coefficients.

For liquid level gauges and/or other one-dimensional positioning devices, only one of the equations (1) would apply, e.g., the equation defining the position along the X axis. Accordingly, the set of weight coefficients for one-dimensional positioning devices would be represented by a vector $w_i$, i=0, . . . , N.

Figure 4:
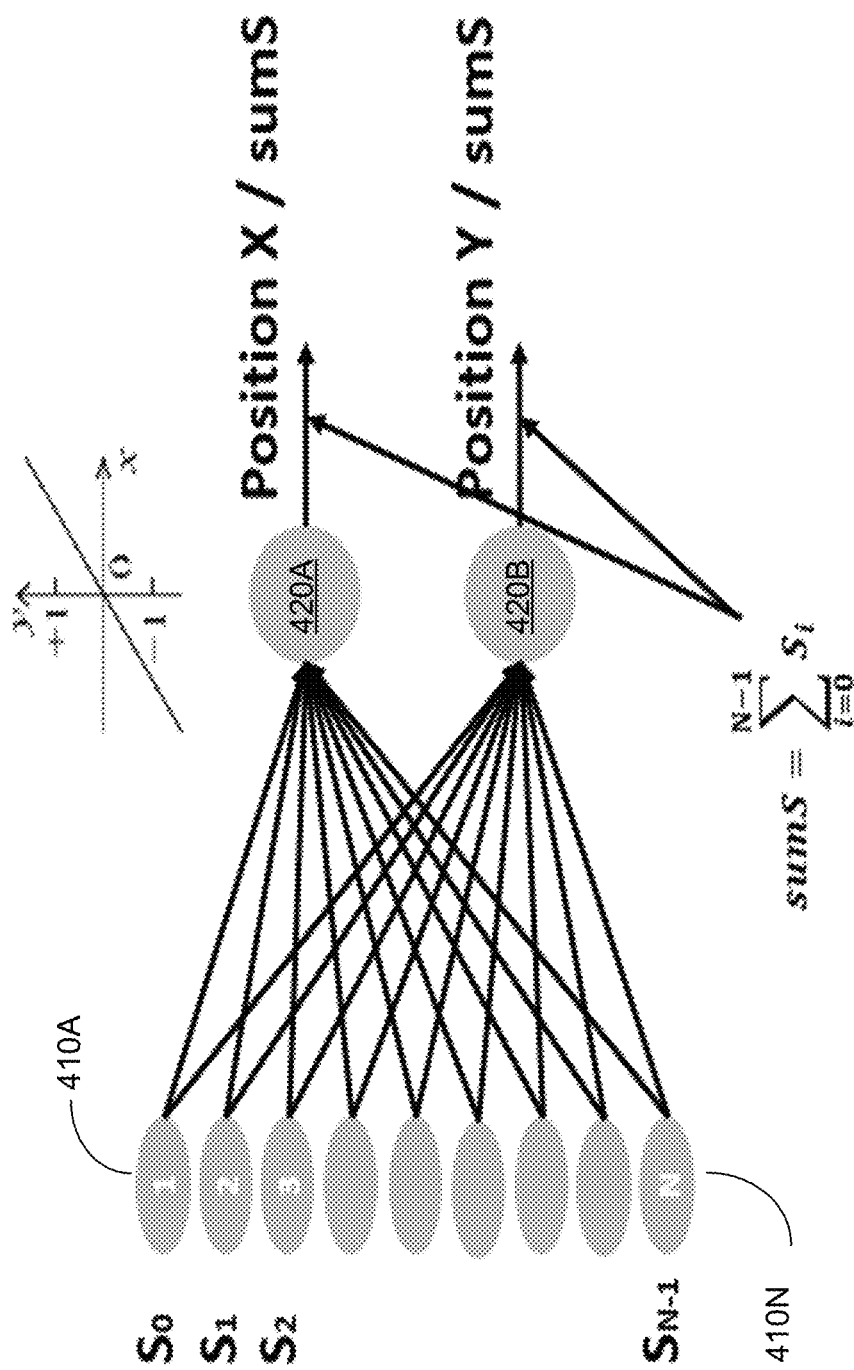
FIG. 4 schematically illustrates the structure of an example neural network utilized for position detection by the systems and methods of the present disclosure.

For both one-dimensional and two-dimensional positioning devices, the equations (1) defining the centroid of the weighted capacitance values may be implemented by a neural network, the structure of which is schematically illustrated by FIG. 4. As shown in FIG. 4, the input layer of the neural network 400 may include a set of input layer neurons 410A-410N receiving the measured capacitance values $S_0 \ldots S_{N-1}$. In some implementations, the input layer neurons 410A-410N can apply one or more trainable filters to the received input values $S_0 \ldots S_{N-1}$. Each filter may implement a combination of one or more linear or non-linear operations. Parameters of the filters may be defined at the network training stage.

The input layer neurons 410A-410N feed the input value $S_0 \ldots S_{N-1}$ to each of the two output layer neurons 420A-420B with respective identity activation functions. Each activation function may compute the respective coordinate of the touch position.

Figure 5:
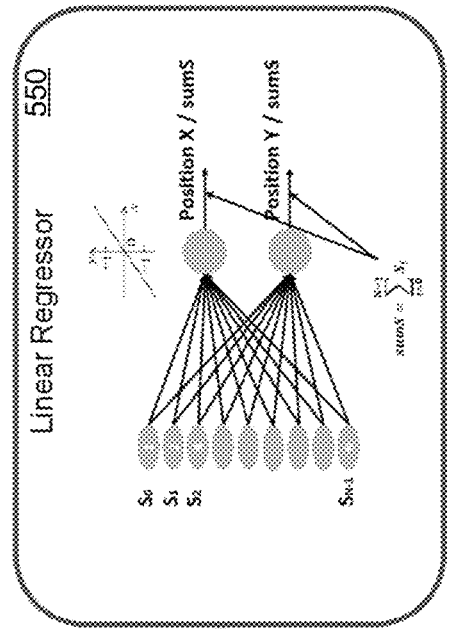
FIG. 5 schematically illustrates an example process of training neural networks utilized for position detection by the systems and methods of the present disclosure.
Figure 5:
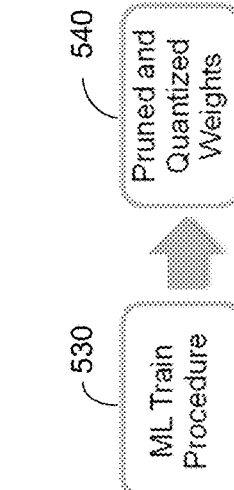
Figure 5:
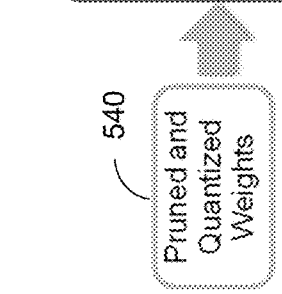
Figure 5:
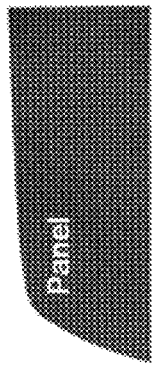
Figure 5:
Figure 5:
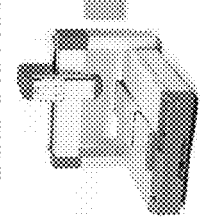

Parameters of the neural network, which essentially correspond to the weight coefficients of equations (1), may be determined by a supervised training process, as schematically illustrated by FIG. 5. As shown in FIG. 5, the data collection operation 520 may involve sequentially applying inputs to a set of neighboring spatial positions on the surface of the touch screen input device 510 and measuring the corresponding capacitance values. In various illustrative examples, the inputs may be applied by a robot and/or other automation tool.

For a liquid level gauge, the data collection operation 520 may involve sequentially incrementing the amount of liquid within the container of the gauge and measuring the corresponding capacitance values between the conductive layer 215A and conductive stripes 220A-220M of FIG. 2.

Alternatively, the capacitance values corresponding to a given set of spatial positions on the surface of the touch screen input device may be generated by a simulation model. The measured or simulated capacitance values in association with the respective spatial positions of the capacitive cells may be stored in a suitable data structure (e.g., a linear array or a rectangular matrix).

Thus, the training data set may include a set of records, such that each record maps a measured capacitance value at a given capacitive cell to the corresponding input value (e.g., the touch position or the liquid level). Accordingly, the neural network training process 530 may involve activating the neural network for every input in the training dataset. The loss function is computed, which reflects the difference of the observed output of the neural network and the desired output (i.e., the touch position or the liquid level) specified by the training data set, and the weights are adjusted accordingly. This process may be repeated until the value of the loss function would fall below a predetermined threshold. The structure and parameters of the loss function can be chosen to attain the desired parameters of the learning process (e.g., the number of training iterations and the accuracy of the trained model).

In some implementations, the trained neural networks can be further processed by various efficiency improvement techniques. In an illustrative example, the neural networks can be pruned in order to reduce the computational complexity of the resulting network. Pruning refers to dropping some artificial neuron connections from the network. A trained baseline neural network may be pruned in order to reduce the number of artificial neuron connections. However, extensive pruning may limit the network's learning capability. Thus, in order to produce a functional network while managing the computational complexity, a baseline network may be trained and then pruned by permanently dropping less significant connections. The adverse effect of pruning on the network performance may be compensated by retraining the network, which may restore some of the pruned connections. Thus, the resulting pruned network inherits the knowledge acquired by the baseline network, while exhibiting much lighter computational complexity. The parameters of the pruning process can be chosen to attain the desired parameters of the trained model (e.g., the computational complexity and the accuracy of the trained model).

In another illustrative example, the neural network can be quantized (i.e., the floating point values may be replaced with integer values) in order to reduce the computational complexity and memory footprint of the resulting network. The quantization parameters can be chosen to attain the desired parameters of the trained model (e.g., the computational complexity and the accuracy of the trained model).

Various other efficiency improvement techniques can be applied to the trained neural networks utilized by the systems and methods of the present disclosure.

The trained neural network 550 with the parameter set 540 corresponding to each local maximum of the set of measured capacity values can be utilized for position determination, e.g., at operation 150 of FIG. 1 for the touch position determination or at operation 250 of FIG. 2 for the liquid level measurement.

Figure 6:
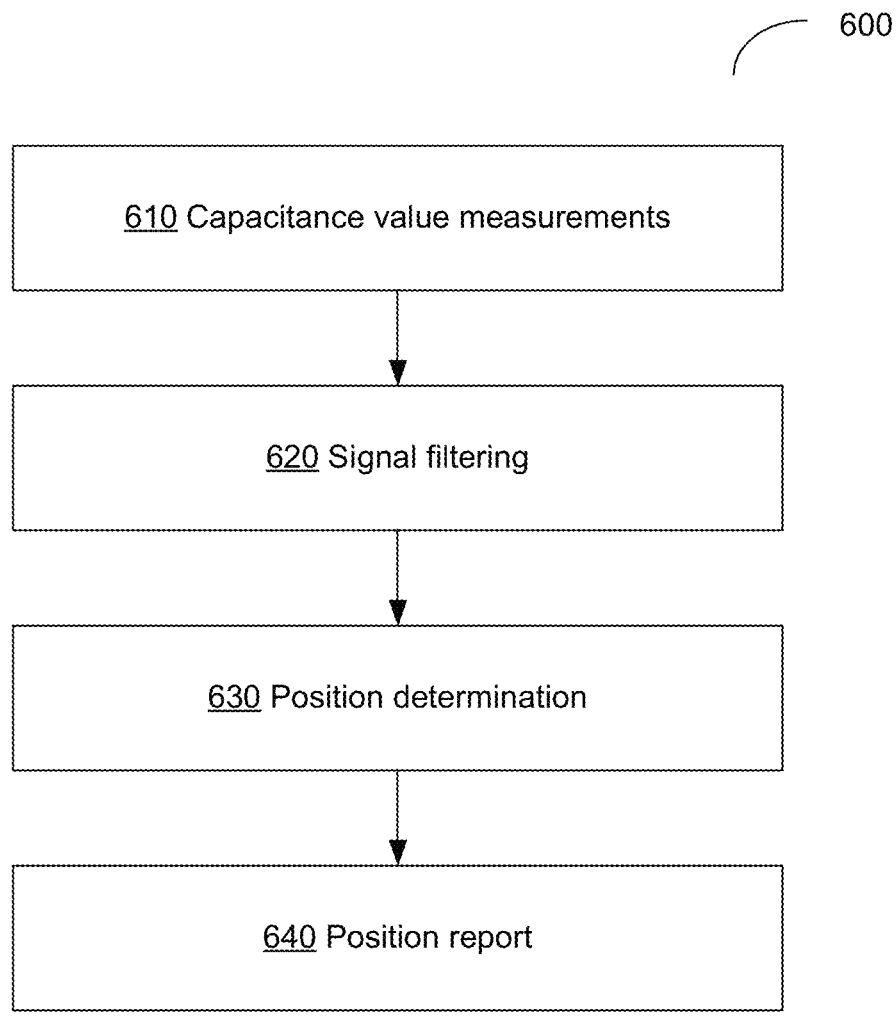
FIG. 6 schematically illustrates a flow chart of an example method of determining the position value reflecting an action applied to the capacitive sensor device, implemented in accordance with aspects of the present disclosure.

FIG. 6 schematically illustrates a flow chart of an example method of determining the position value reflecting an action applied to the capacitive sensor device, implemented in accordance with aspects of the present disclosure. The method 600 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 600 may be performed in parallel or in an order that may differ from the order described below. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. In various illustrative examples, the method 600 may be performed by computing devices equipped with general purpose processors or by computing devices having limited computational capacity and/or available memory (such as portable communication devices, embedded devices, Internet of Things (IoT) devices, etc.). In some implementations, the method 600 may be performed by the computing system 800 of FIG. 8.

At operation 610, the processing device implementing the method measures a set of capacitance values of a plurality of capacitive cells of a capacitive sensor device. In various illustrative examples, the capacitive sensor device may be provided, e.g., by a touch input device (e.g., a touch screen, a trackpad, or a slider) or a liquid level gauge, as described in more detail herein above.

At operation 620, the processing device performs signal filtering operations with respect to the measured capacitance values for improving the signal-to-noise ratio. In an illustrative example, the processing device may implement an infinite impulse response (IIR) filter. Various other suitable filters may be utilized.

At operation 630, the processing device performs the position determination based on the filtered set of measurements. In an illustrative example, the position determination may involve determining a local maximum of the set of capacitance values, selecting a set of weights associated with the capacitive sensor position corresponding to the identified local maximum, and processing the set of capacitance values by a neural network using the identified set of weights, in order to determine the position value reflecting the action applied to the capacitive sensor device (e.g., the touch position or the liquid level), as described in more detail herein below with references to FIG. 7.

At operation 640, the processing device generates the position report reflecting the screen coordinates of the detected touch position(s) or the measured liquid level(s). The position report may be represented by a message specifying the determined position(s) and various other parameters of the detected touch event. The position report may be sent, e.g., to one or more processing threads (applications), as described in more detail herein above.

Figure 7:
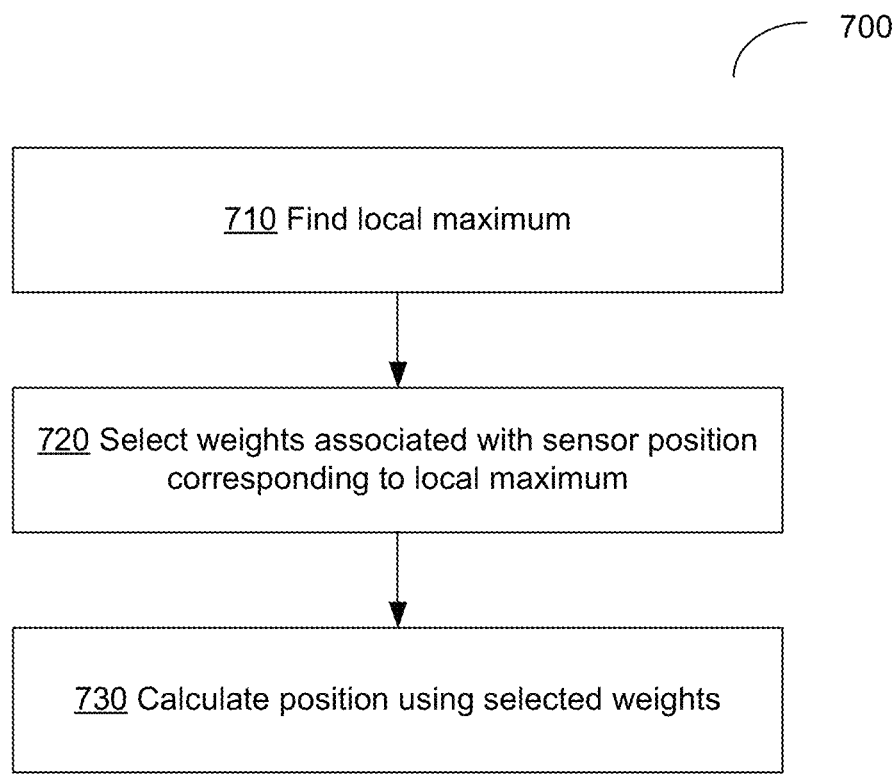
FIG. 7 schematically illustrates a flow chart of an example method of computing the position value by a neural network implemented in accordance with aspects of the present disclosure.

FIG. 7 schematically illustrates a flow chart of an example method of computing the position value by a neural network implemented in accordance with aspects of the present disclosure. The method 700 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 700 may be performed in parallel or in an order that may differ from the order described below. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. In various illustrative examples, the method 700 may be performed by computing devices equipped with general purpose processors or by computing devices having limited computational capacity and/or available memory (such as portable communication devices, embedded devices, Internet of Things (IoT) devices, etc.). In some implementations, the method 700 may be performed by the computing system 800 of FIG. 8.

At operation 710, the processing device implementing the method determines a local maximum of the set of measured capacitance values, as describe in more detail herein above.

At operation 720, the processing device selects a set of weights associated with the capacitive sensor position corresponding to the identified local maximum, as describe in more detail herein above.

At operation 730, the processing device feeds the set of capacitance values to a trained neural network using the identified set of weights. The neural network produces the position value reflecting the action applied to the capacitive sensor device (e.g., the touch position or the liquid level), as describe in more detail herein above.

Figure 8:
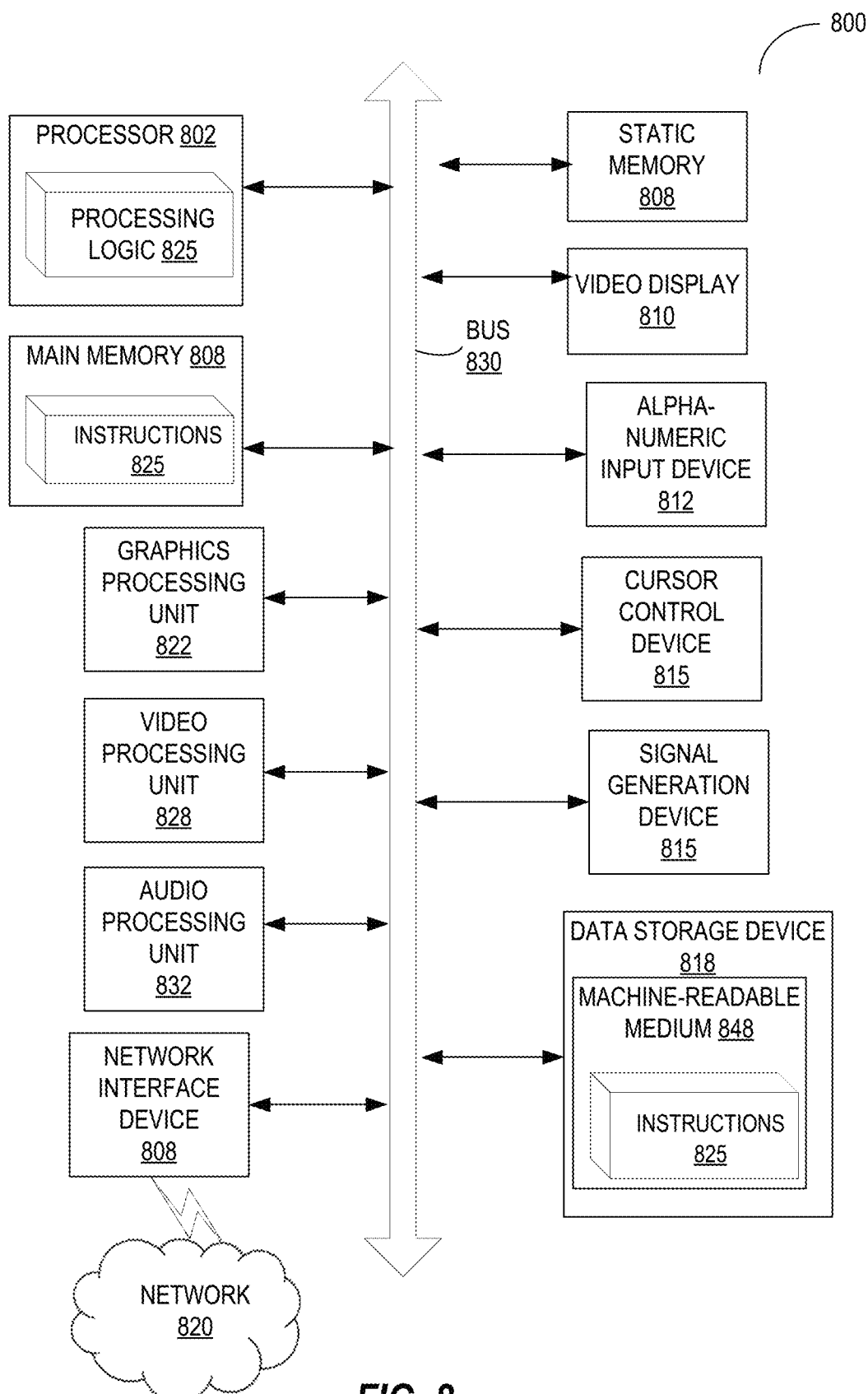
FIG. 8 illustrates a diagrammatic representation of a machine in the example form of a computing system within which a set of instructions, for causing the machine to perform any one or more of the methods discussed herein, may be executed

FIG. 8 illustrates a diagrammatic representation of a machine in the example form of a computing system 800 within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacitance of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 800 includes a processing device 802, main memory 808 (e.g., read-only memory (ROM), flash memory, dynamic random access memory (DRAM) (such as synchronous DRAM (SDRAM) or DRAM (RDRAM), etc.), a static memory 808 (e.g., flash memory, static random access memory (SRAM), etc.), and a data storage device 818, which communicate with each other via a bus 830.

Processing device 802 represents one or more general-purpose processing devices such as a microprocessor device, central processing unit, or the like processing device. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 802 may also be one or more special-purpose processing devices such as an application specific integrated circuit (ASIC), a field programmable gate array (FPGA), a digital signal processing device (DSP), network processing device, or the like. In one implementation, processing device 802 may include one or more processing device cores. The processing device 802 is configured to execute instructions 825 for performing the operations discussed herein.

The computing system 800 may include other components as described herein. The computing system 800 may further include a network interface device 808 communicably coupled to a network 820. The computing system 800 also may include a video display unit 810 (e.g., a liquid crystal display (LCD)), an alphanumeric input device 812 (e.g., a keyboard), a cursor control device 815 (e.g., a mouse), a signal generation device 815 (e.g., a speaker), or other peripheral devices. Furthermore, computing system 800 may include a graphics processing unit 822, a video processing unit 828 and an audio processing unit 832. In another implementation, the computing system 800 may include a chipset (not illustrated), which refers to a group of integrated circuits, or chips, that are designed to work with the processing device 802 and controls communications between the processing device 802 and external devices. For example, the chipset may be a set of chips on a motherboard that links the processing device 802 to very high-speed devices, such as main memory 808 and graphic controllers, as well as linking the processing device 802 to lower-speed peripheral buses of peripherals, such as USB, PCI, or ISA buses.

The data storage device 818 may include a computer-readable storage medium 848 on which is stored instructions 825 embodying any one or more of the methodologies of functions described herein. The instructions 825 may also reside, completely or at least partially, within the main memory 808 as instructions 825 and/or within the processing device 802 as processing logic during execution thereof by the computing system 800; the main memory 808 and the processing device 802 also constituting computer-readable storage media.

The computer-readable storage medium 848 may also be used to store instructions 825, which, when executed by the processing device 802, cause the processing device to implement the method 400 of generating computationally-efficient neural networks.

While the computer-readable storage medium 848 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A method, comprising:
   receiving, by a processing device, a set of capacitance values of a plurality of capacitive cells of a capacitive sensor device;
   determining a local maximum of the set of capacitance values, wherein the local maximum corresponds to a subset of the plurality of capacitive cells;
   identifying a set of neural network parameters corresponding to (i) the local maximum of the set of capacitance values and (ii) at least one capacitive cell of the subset of the plurality of capacitive cells; and
   processing the set of capacitance values by a neural network using the identified set of neural network parameters to determine a position value reflecting an action applied to the capacitive sensor device.

2. The method of claim 1, wherein the capacitive sensor device is a touch input device comprising an array of capacitive cells configured to receive touch inputs.

3. The method of claim 1, wherein the capacitive sensor device is a liquid level gauge comprising an array of conductive stripes attached to a container configured to receive liquid.

4. The method of claim 1, wherein the capacitive sensor device includes an array of capacitive cells arranged into a grid.

5. The method of claim 1, wherein the capacitive sensor device includes an array of capacitive cells that form a surface provided by one of: a non-planar surface, a curve-shaped surface, an irregularly shaped surface, or a non-compact surface.

6. The method of claim 1, further comprising:
supplying the position value to an application implementing a graphical user interface.

7. The method of claim 1, further comprising:
filtering the set of measured capacitance values.

8. The method of claim 1, wherein the position value is represented by a centroid of the set of capacitance values.

9. The method of claim 1, wherein the neural network comprises a plurality of input layer neurons, wherein each input layer neuron corresponds to a measured capacitance value.

10. The method of claim 1, wherein the neural network comprises a plurality of output layer neurons, wherein each output layer neuron implements an identity activation function computing a value reflecting a component of the position value.

11. A system, comprising:
a memory; and
a processing device, coupled to the memory, the processing device configured to:
receive a set of capacitance values of a plurality of capacitive cells of a capacitive sensor device;
determine a local maximum of the set of capacitance values, wherein the local maximum corresponds to a subset of the plurality of capacitive cells;
identify a set of neural network parameters corresponding to (i) the local maximum of the set of capacitance values and (ii) at least one capacitive cell of the subset of the plurality of capacitive cells; and
process the set of capacitance values by a neural network using the identified set of neural network parameters to determine a position value reflecting an action applied to the capacitive sensor device.

12. The system of claim 11, wherein the capacitive sensor device is a touch input device comprising an array of capacitive cells configured to receive touch inputs.

13. The system of claim 11, wherein the capacitive sensor device is a liquid level gauge comprising an array of conductive stripes attached to a container configured to receive liquid.

14. The system of claim 11, wherein the position value is represented by a centroid of the set of capacitance values.

15. The system of claim 11, wherein the neural network comprises a plurality of output layer neurons, wherein each output layer neuron implements an identity activation function computing a value reflecting a component of the position value.

16. A non-transitory computer-readable storage medium storing executable instructions which, when executed by a processing device, cause the processing device to:
receive a set of capacitance values of a plurality of capacitive cells of a capacitive sensor device;
determining a local maximum of the set of capacitance values, wherein the local maximum corresponds to a subset of the plurality of capacitive cells;
identifying a set of neural network parameters corresponding to (i) the local maximum of the set of capacitance values and (ii) at least one capacitive cell of the subset of the plurality of capacitive cells; and
processing the set of capacitance values by a neural network using the identified set of neural network parameters to determine a position value reflecting an action applied to the capacitive sensor device.

17. The non-transitory computer-readable storage medium of claim 16, wherein the capacitive sensor device is a touch input device comprising an array of capacitive cells configured to receive touch inputs.

18. The non-transitory computer-readable storage medium of claim 16, wherein the capacitive sensor device includes an array of capacitive cells that form a surface provided by one of: a non-planar surface, a curve-shaped surface, an irregularly shaped surface, or a non-compact surface.

19. The non-transitory computer-readable storage medium of claim 16, wherein the capacitive sensor device is a liquid level gauge comprising an array of conductive stripes attached to a container configured to receive liquid.

20. The non-transitory computer-readable storage medium of claim 16, wherein the capacitive sensor device includes an array of capacitive cells arranged into a two-dimensional grid.

* * * * *